(12) United States Patent
Bandaru et al.

(10) Patent No.: US 9,087,035 B1
(45) Date of Patent: Jul. 21, 2015

(54) WEBSITE CREATION AND MANAGEMENT BASED ON WEB ANALYTICS DATA

(75) Inventors: Nagaraju Bandaru, Menlo Park, CA (US); Nirmala Ranganathan, Saratoga, CA (US); Nivethitha Kumar, Sunnyvale, CA (US); Ralph Emerson Matlack, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1129 days.

(21) Appl. No.: 13/077,714

(22) Filed: Mar. 31, 2011

(51) Int. Cl.
G06F 17/00 (2006.01)
G06F 3/00 (2006.01)
G06F 17/24 (2006.01)
G06F 17/30 (2006.01)
G06F 17/21 (2006.01)

(52) U.S. Cl.
CPC ............ *G06F 17/248* (2013.01); *G06F 17/212* (2013.01); *G06F 17/3089* (2013.01)

(58) Field of Classification Search
CPC ............ G06F 17/248; G06F 17/30861; G06F 17/3089; G06F 17/3064; H04L 67/22; G06Q 30/02; G06Q 30/00; G06Q 30/0255
See application file for complete search history.

(56) References Cited

U.S. PATENT DOCUMENTS

| | | | |
|---|---|---|---|
| 2008/0065974 A1* | 3/2008 | Campbell | 715/200 |
| 2008/0162699 A1* | 7/2008 | Gaffney | 709/226 |
| 2008/0189156 A1* | 8/2008 | Voda et al. | 705/7 |
| 2009/0119179 A1* | 5/2009 | Kolve et al. | 705/14 |
| 2009/0282343 A1* | 11/2009 | Catlin et al. | 715/738 |
| 2010/0313183 A1* | 12/2010 | Ellen et al. | 717/110 |
| 2011/0167360 A1* | 7/2011 | Aitken et al. | 715/760 |
| 2012/0041938 A1* | 2/2012 | Yu et al. | 707/709 |
| 2012/0158461 A1* | 6/2012 | Aldrey et al. | 705/7.35 |

* cited by examiner

*Primary Examiner* — Kavita Padmanabhan
*Assistant Examiner* — Ariel Mercado
(74) *Attorney, Agent, or Firm* — Osha • Liang LLP

(57) ABSTRACT

A method including identifying a business category of a business related to a user, obtaining multiple website analytics data items from multiple websites related to multiple business in the business category, evaluating the multiple website analytics data items to generate multiple website templates for the user, providing the multiple website templates to the user, receiving a selection from the user of a website template from the multiple website templates, receiving website content for a user website from the user, evaluating the multiple website analytics data items and the website content to generate multiple recommendations for the user website, providing the multiple recommendations for the user website to the user, receiving multiple recommendation approvals of the multiple recommendations for the user website from the user, and generating the user website based on the website content, the website template, and the multiple recommendation approvals.

20 Claims, 7 Drawing Sheets

User Reporting Interface
500

Conversion Rate = _____

Visits Per Month = _____

Current Ranking: _____

Ranking Change: _____

Average Conversion Rate in Category: _____

Average Visits Per Month in Category: _____

Top Rankers:
1. _____
2. _____
3. _____

Most Improved:
1. _____
2. _____
3. _____

What others have done recently that worked:
1. _____
2. _____
3. _____

|                                    | Rec. 1 | Rec. 2 | Rec. 3 |
|------------------------------------|--------|--------|--------|
| Estimated Conversion Rate Increase | —      | —      | —      |
| Estimated % Increase in Visits     | —      | —      | —      |

WEBSITE CREATION AND MANAGEMENT BASED ON WEB ANALYTICS DATA

CROSS-REFERENCE TO RELATED APPLICATIONS

The present application contains subject matter that may be related to the subject matter in the U.S. application entitled "METHOD AND SYSTEM FOR GENERATING A MODIFIED WEBSITE" (Ser. No. 13/077,683), filed on Mar. 31, 2011, and assigned to the assignee of the present application.

BACKGROUND

Many organizations (e.g., corporations, small businesses, non-profit groups, academic institutions, government bodies, households, individuals, trusts, estates, or other entities) may desire to create a website for various reasons (e.g., selling a product or service, advertising, obtaining customers, sharing information, etc.). In some cases, the individual(s) responsible for creating a website (e.g., users) may have little experience in website design best practices. In addition, the individual(s) creating the website may have little knowledge of how visitors that visit their website behave and how to maximize the chance of a visitor producing a desirable outcome (e.g., buying a product, becoming a member, clicking on an advertisement, etc.). Further, the individual(s) creating the website may be inexperienced with techniques such as search engine optimization (SEO) and search engine marketing (SEM) that may attract more visitors to the proposed website. Even individual(s) with significant experience in website design may have little knowledge of what techniques and website elements (e.g., layout, organization, content) are best suited for a particular type of website (e.g., online sales, corporate website, blog, etc.) in a particular category (e.g., business industry, blog type) and what volume of desirable outcomes (e.g., sales, profit, subscriptions, downloads, ad-clicks) can be obtained from the website.

SUMMARY

In general, in one aspect, the invention relates to a method for managing websites. The method comprises identifying a business category of a business related to a user. The method further comprises obtaining a plurality of website analytics data items from a plurality of websites related to a plurality of businesses in the business category. The method further comprises evaluating the plurality of website analytics data items to generate a plurality of website templates for the user. The method further comprises providing the plurality of website templates to the user. The method further comprises receiving a selection from the user of a website template from the plurality of website templates. The method further comprises receiving website content for a user website from the user. The method further comprises evaluating the plurality of website analytics data items and the website content to generate a plurality of recommendations for the user website. The method further comprises providing the plurality of recommendations for the user website to the user. The method further comprises receiving a plurality of recommendation approvals of the plurality of recommendations for the user website from the user. The method further comprises generating the user website based on the website content, the website template, and the plurality of recommendation approvals.

In general, in one aspect, the invention relates to a non-transitory computer readable storage medium comprising instructions for managing websites. The instructions comprise functionality for identifying a business category of a business related to a user. The instructions further comprise functionality for obtaining a plurality of website analytics data items from a plurality of websites related to a plurality of businesses in the business category. The instructions further comprise functionality for evaluating the plurality of website analytics data items to generate a plurality of website templates for the user. The instructions further comprise functionality for providing the plurality of website templates to the user. The instructions further comprise functionality for receiving a selection from the user of a website template from the plurality of website templates. The instructions further comprise functionality for receiving website content for a user website from the user. The instructions further comprise functionality for evaluating the plurality of website analytics data items and the website content to generate a plurality of recommendations for the user website. The instructions further comprise functionality for providing the plurality of recommendations for the user website to the user. The instructions further comprise functionality for receiving a plurality of recommendation approvals of the plurality of recommendations for the user website from the user. The instructions further comprise functionality for generating the user website based on the website content, the website template, and the plurality of recommendation approvals.

In general, in one aspect, the invention relates to a system for managing websites. The system comprises a web analytics application configured to identify a business category of a business related to a user, obtain a plurality of businesses in the business category, evaluate the plurality of website analytics data items to generate a plurality of website templates for the user, provide the plurality of website templates to the user, receive a selection from the user of a website template from the plurality of website templates, receive website content for a user website from the user, evaluate the plurality of website analytics data items and the website content to generate a plurality of recommendations for the user website, provide the plurality of recommendations for the user website to the user, receive a plurality of recommendation approvals of the plurality of recommendations for the user website from the user, and generate the user website based on the website content, the website template, and the plurality of recommendation approvals. The system further comprises a data repository configured to store the plurality of web analytics data items and the plurality of website templates.

Other aspects and advantages of the invention will be apparent from the following description and the appended claims.

BRIEF DESCRIPTION OF DRAWINGS

FIG. 4, FIG. 5, and FIG. 6 show examples in accordance with one or more embodiments of the invention.

DETAILED DESCRIPTION

Figure 1:
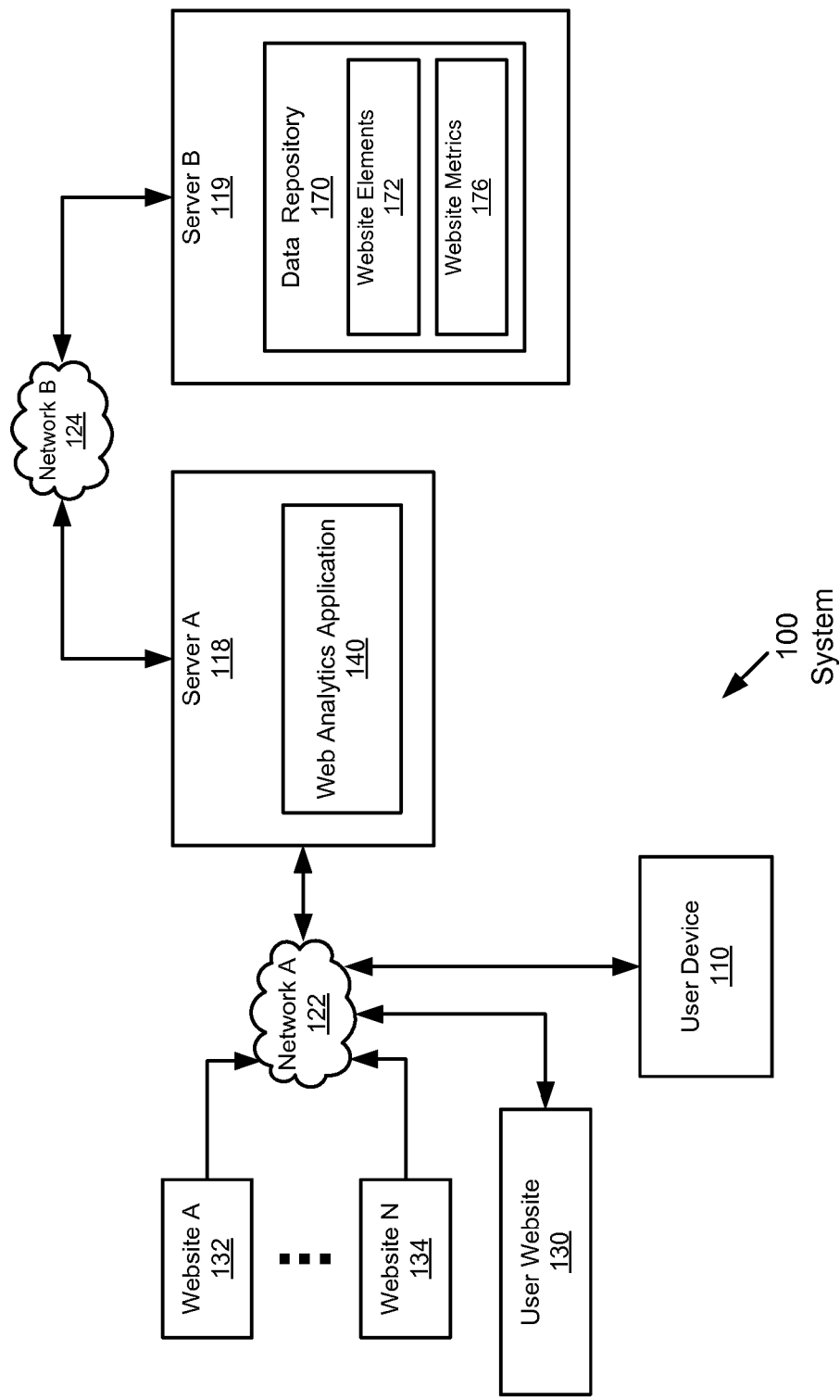
FIG. 1 shows a system having multiple components in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

In general, embodiments of the invention provide a system and method to assist a user (e.g., a business owner) in creating and managing a website. Specifically, the website may be generated in an attempt to improve or optimize various website metrics (e.g., conversion rate, number of visits, etc.). To generate the website, web analytics data is obtained from websites in a similar category (e.g., industry, location, website content) as a proposed website of the user. The web analytics data is analyzed and, based on the analysis, website templates and recommendations are generated for the proposed website of the user. The user may then create the website using one of the website templates while also following the generated recommendations. Subsequently, the user may monitor and update the website using a performance analysis and updated recommendations, respectively, obtained from updated web analytics data collected at a later point in time.

FIG. 1 shows a system (100) in accordance with one or more embodiments of the invention. As shown in FIG. 1, the system (100) includes a user device (110) connected, via a network (e.g., network A (122)), to a server (e.g., server A (118)) hosting a web analytics application (140) that may access multiple websites (e.g. website A (132), website N (134)) including a user website (130), also via network A (122), in accordance with one or more embodiments of the invention. Further, the system (100) includes another server (e.g., server B (119)) hosting a data repository (170) and connected to server A (118) via a network (e.g., network B (124)) in accordance with one or more embodiments of the invention.

In one or more embodiments of the invention, websites (e.g. website A (132), website N (134)) are stored on web servers (not shown) and connected to server A (118) using an Internet connection (via network A (122)). In one or more embodiments of the invention, some or all of the websites (e.g. website A (132), website N (134)) are stored locally on a web server that is the same device as server A (118), server B (119), or the user device (110). The websites (e.g. website A (132), website N (134)) may be owned or operated by various entities including large businesses, small businesses, corporations, partnerships, non-profit groups, individuals, service providers, retailers, academic institutions, government bodies, households, trusts, estates, and other entities. Those skilled in the art, having the benefit of this detailed description, will appreciate that a website may correspond to many different entities. The websites (e.g. website A (132), website N (134)) may be of several types including business websites, auction websites, online shopping websites, social networking websites, blogs, message boards, information websites, and other types. Those skilled in the art, having the benefit of this detailed description, will appreciate that many other types of websites exist.

In one or more embodiments of the invention, the user website (130) is owned or operated by any of the entities discussed above. Further, the user website (130) may be any of the types of websites discussed above. In one or more embodiments of the invention, several websites (e.g. website A (132), website N (134)) are in the same category as the user website. For example, the websites (e.g. website A (132), website N (134)) may be operated or owned by a businesses in the same industry as the business that owns or operates the user website (130) (i.e., the business category is the industry of a business). In another example, the websites (e.g. website A (132), website N (134)) may operated or owned by businesses in the same location as the business that owns or operates the user website (130). In another example, the websites (e.g. website A (132), website N (134)) may offer similar products or services as those offered by the user website (130). In another example, in the case that the user website (130) is a blog or an information website, the websites (e.g. website A (132), website N (134)) may have similar content to content on the user website (130). In one or more embodiments of the invention, the user website (130) may be a webpage or a profile on a social networking website (not shown). Generally speaking, websites may be categorized based on other characteristics or metrics that are relevant to the user website, including: customer base, volume of visits, size of a business, etc. Those skilled in the art, having the benefit of this detailed description, will appreciate that many other ways of categorizing websites exist and may be used to relate one or more websites (e.g., website A (132), website N (134)) with the user website (130).

Continuing with FIG. 1, server A (118) and server B (119) are computer systems (e.g., one or more mainframes, computer farms, laptops, personal digital assistants (PDA), desktop personal computers (PC), etc.) in accordance with one or more embodiments of the invention. In one or more embodiments of the invention, server A (118) and server B (119) include the same functionality (i.e., the web analytics application (140) and the data repository (170) may exist on the same server). Further, server A (118) and server B (119) may be connected by a network (e.g., network B (124)) that may include wired and wireless segments, an Internet connection, or a direct electronic connection (e.g., USB, FireWire, and other connection standards). In one or more embodiments of the invention, server B (119) may have access to network A (122) and thus may directly obtain web analytics data from the websites (e.g. website A (132), website N (134)) and the user website (130).

In one or more embodiments of the invention, the web analytics application (140) includes any combination of software and software components (e.g., data structures, algorithms, procedures, libraries, modules, interfaces, frameworks, applets, web applications, desktop applications, browsers, etc.). The web analytics application (140) may execute on server A (118) and perform the steps required to create and manage the user website (130), including collecting and filtering web analytics data, assembling website templates, providing recommendations before, during, and after the creation of the user website (130), and evaluating the performance of the user website (130). Although FIG. 1 shows the web analytics application (140) executing on server A (118), the web analytics application (140) or portions of the web analytics application (140) may execute or exist on one or more other servers. Individual components of the web analytics application (140) are further described below.

Continuing with FIG. 1, the data repository (170) includes any combination of hardware (e.g., one or more magnetic disk drives, flash, Random-Access Memory (RAM), etc.) and software (e.g., database systems) that executes on server B (119) and stores the web analytics data obtained from the websites (e.g. website A (132), website N (134)) and the user website (130) in accordance with one or more embodiments of the invention. The data repository (170) may store web analytics data from various time periods to allow for comparisons between changes in the web analytics data. In one or more embodiments of the invention, the web analytics application (140) accesses, uses, and modifies web analytics data stored in the data repository (170). Although FIG. 1 shows the data repository (170) executing on server B (119), the data repository (170) or portions of the data repository (170) may execute or exist on one or more other servers. The data repository may store website elements (172) and website metrics (176), which are further described below.

In one or more embodiments of the invention, web analytics data (not shown) is defined as data obtained from websites (e.g. website A (132), website N (134)) and the user website (130) that may be used for web analytics analysis (for instance, by the web analytics application (140)). Web analytics data may include website metrics (176), such as number of visits, a click path made by visitors, percentage of visitors making purchases, conversion rate, etc. In the case that the user website (130) is part of a social networking website, the website metrics (176) may include any website metrics provided by the social networking website (e.g., number of "likes", number of comments, and other relevant metrics). More instances of website metrics are further described below. In addition, web analytics data may include website elements (172), such as website content, layout, organization, pages, links, text, website templates, add-ons, color, etc. Those skilled in the art, having the benefit of this detailed description, will appreciate that many other types of data obtained from websites (e.g. website A (132), website N (134)) and the user website (130) may be used for web analytics analysis.

In one or more embodiments of the invention, the user device (110) is a computer system (e.g., a server, mainframe, desktop personal computer (PC), laptop, personal digital assistant (PDA), mobile phone, etc.) used by a user to create the user website (130). The user is an individual who creates, owns, or operates the user website (130), whereas a visitor is an individual who visits the user website (130). The user may utilize the user device (110) to connect to the web analytics application (140) via network A (122) and share data with the web analytics application (140). In one or more embodiments of the invention, the user device (110) stores and executes at least a portion of the web analytics application (140) and stores at least a portion of the web analytics data in the data repository (170). In one or more embodiments of the invention, the user device (110) is a web server that hosts the user website (130). In one or more embodiments of the invention, the user device (110) is a terminal directly connected to server A (118) or server B (119).

In one or more embodiments of the invention, the user website (130) is created to produce goal achievements for the user. A goal achievement (not shown) is a desirable outcome for the user based on the actions of one or more visitors. In the case of a business website, goal achievements may include selling a product on the website (e.g., generating revenue) or obtaining subscriptions from visitors (e.g., increasing the potential client base). In the case of a blog or informational website, goal achievements may include obtaining a certain number of visitors per month, obtaining subscriptions to the website, or receiving a click on an advertisement displayed on the website. Those skilled in the art, having the benefit of this detailed description, will appreciate that many other goal achievements exist for various website categories.

Figure 2:
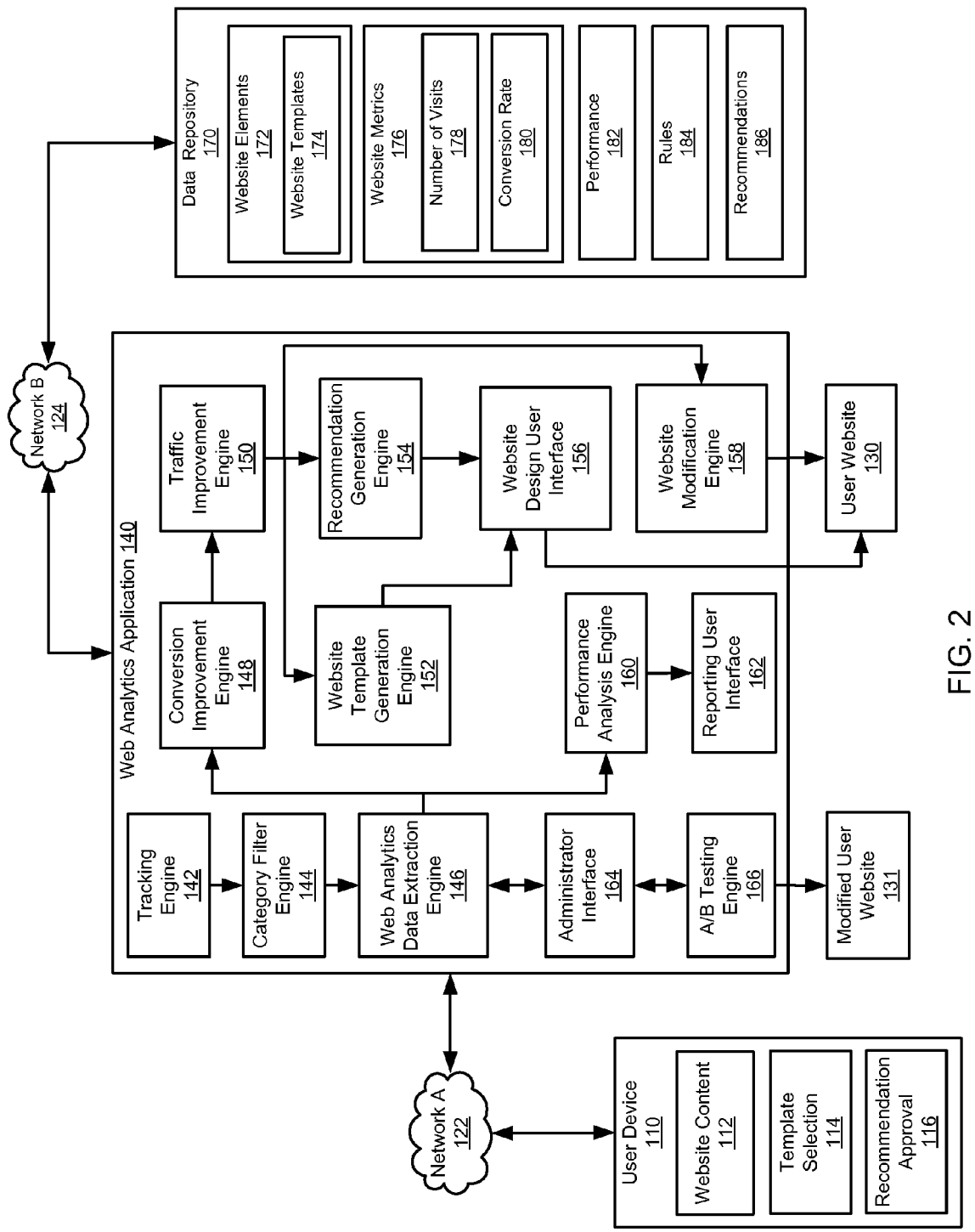
FIG. 2 shows one or more components of the system in FIG. 1, in accordance with one or more embodiments of the invention.

FIG. 2. shows the individual components of the user device (110), the web analytics application (140), and the data repository (170) shown in FIG. 1 in accordance with one or more embodiments of the invention. Those skilled in the art, having the benefit of this detailed description, will appreciate the organization of the components in FIG. 2 may differ among embodiments of the invention, and that one or more of the components may be optional. Further, those skilled in the art, having the benefit of this detailed description, will appreciate that although the components in FIG. 2 are organized to enable a certain flow of data, some of the components in FIG. 2. may process data in parallel as other components in FIG. 2.

As discussed above, the data repository (170) stores, for each website parsed (e.g. website A (132), website N (134), user website (130)), web analytics data including website elements (172) and website metrics (176) shown in FIG. 1. As discussed above, website elements (172) may include website templates (174) for the user website (130) and for websites of other users of the web analytics application (140). As discussed above, website metrics (176) may include a number of visits (178) and a conversion rate (180) for the user website (130) and each website parsed (e.g. website A (132), website N (134)). In addition, the data repository (170) may include a performance (182) of the user website (130) and each website parsed (e.g. website A (132), website N (134)), rules (184) for the web analytics application (140), and recommendations (186) for the user website (130) and for websites of other users of the web analytics application (140). Each element stored in the data repository (140) is further described below. Those skilled in the art, having the benefit of this detailed description, will appreciate that the specific data stored in the data repository (170) only serves as an example and any other data not mentioned that may be relevant to web analytics analysis may be stored in the data repository (170) as well.

In one or more embodiments of the invention, website templates (174) may include generic sections of a website (e.g., header, footer, navigation bar, introduction, body, front page image space, etc.), website characteristics (e.g., background color, style, etc.) and a website organization (e.g., number of website pages, links, page hierarchy, etc.). The website templates (174) may be essentially websites that lack website content from the user; in other words, the website templates (174) may be filled in with website content from the user to generate the user website (130). Those skilled in the art, having the benefit of this detailed description, will appreciate that the website templates (174) may include many other sections that facilitate the creation of the user website (130).

In one or more embodiments of the invention, recommendations (186) are generated by the web analytics application (140) and may include proposed modifications to the user website (130). In one or more embodiments of the invention, the recommendations (186) are generated based on a current state of the user website (130) (e.g., the website elements (172) of the user website) and stored in the data repository (170) for accessing later. In one or more embodiments of the invention, the recommendations (186) are not stored in the data repository (170) but are generated in real-time when the user is creating or modifying the user website (130). In general, the proposed modifications associated with the recommendations (186) may improve the website metrics (176) of the user website (130).

Generally speaking, a performance (182) of a website may be based on a number of goal achievements produced by the website in a certain time interval (e.g., one week). While the performance (182) of the website may greatly depend, for example, on the quality of content or the quality of products sold on the website, the performance (182) generally also depends on other factors such as website organization, layout, text, templates, add-ons, color, etc. To maximize the performance (182) of a website, the aforementioned website elements may need to be modified. For example, the number of purchases on a website of an online apparel store may be increased by advertising on-sale items on the front page of the website, thus increasing the number of goal achievements and the performance (182). Those skilled in the art, having the benefit of this detailed description, will appreciate that many other versions of calculating the performance (182) of a website exist and that the specific definitions above serve as examples. For example, the performance (182) of a website may be a number of visits (178) (e.g., the goal achievement for websites that advertise may be a obtaining a visit). In another example, the performance of a website may be a conversion rate (180).

In one or more embodiments of the invention, a number of visits (178) is defined as the number of page requests (e.g., loading the website for the first time, clicking on a link within a website, or refreshing the website) from a unique visitor within some specified time margin. For example, if the time margin is 30 minutes, then a visitor actively browsing the website for 45 minutes will most likely register two visits. In another example, a visitor pressing the refresh button on a browser multiple times for 10 minutes will still only register one visit. Those skilled in the art, having the benefit of this detailed description, will appreciate that many other versions for calculating the number of visits (178) exist.

In one or more embodiments of the invention, a conversion rate (180) is defined as the ratio of a number of goal achievements to the number of visits (178). In other words, the conversion rate (180) is a measure of what percentage of visitors who visit the website "convert" into customers/consumers by buying a product or service, subscribing as a member, or obtaining some other goal achievement, as discussed above. For example, if a website's goal achievement is a sale of a product and 20 products are sold per day out of 400 daily visits, then the conversion rate (180) is 20/400=5%. Those skilled in the art, having the benefit of this detailed description, will appreciate that although a specific calculation for the conversion rate (180) is given, many other versions of calculating the conversion rate (180) exist. For example, a conversion rate (180) may be a ratio of goal achievements to a number of visitors (not shown).

In one or more embodiments of the invention, rules (184) are parameters that direct and modify the functionality of the web analytics application (140). For example, the web analytics application (140) may deduce that a specific change to a website increases the conversion rate, this information may become an additional rule of the rules (184) and may be stored the data repository (170). Subsequently, this rule may be used to modify which of the website templates (174) and which of the recommendations (186) are provided to the user.

Continuing with FIG. 2, the web analytics application (140) includes a tracking engine (142), an industry filter engine (144), a web analytics data extraction engine (146), a conversion improvement engine (148), a traffic improvement engine (150), a website template generation engine (152), a recommendation generation engine (154), a website design user interface (156), a website modification engine (158), a performance analysis engine (160), a reporting user interface (162), an analysis user interface (164), and an A/B testing engine (166) in accordance to one or more embodiments of the invention. In one or more embodiments of the invention, any one component or any one part of a component of the web analytics application (140) may be stored or executed elsewhere (e.g., on a remote server (not shown), on a user device (110), or any other device). Likewise, one or more of the components (including all or some of the functionality) may be combined to operate as a single component. Each component of the web analytics application (140) is discussed below.

In one or more embodiments of the invention, the tracking engine (142) includes any combination of software and software components (e.g., data structures, algorithms, procedures, libraries, modules, interfaces, frameworks, applets, web applications, desktop applications, browsers, etc.). The tracking engine (142) may visit websites (e.g. website A (132), website N (134) in FIG. 1) and the user website (130) and obtain web analytics data from the websites (e.g. website A (132), website N (134) in FIG. 1) and user website (130). In one or more embodiments of the invention, the tracking engine obtains data using page tagging applets implemented on the websites (e.g. website A (132), website N (134) in FIG. 1) and the user website (130). In one or more embodiments of the invention, the tracking engine parses log files of the web servers hosting the websites (e.g. website A (132), website N (134) in FIG. 1) and the user website (130). In one or more embodiments of the invention, the web analytics data is obtained from a third party (e.g., purchased from a company specializing in web analytics). In one of more embodiments of the invention, the tracking engine stores a portion of the web analytics data in the data repository (170).

In one or more embodiments of the invention, the category filter engine (144) includes any combination of software and software components (e.g., data structures, algorithms, procedures, libraries, modules, interfaces, frameworks, applets, web applications, desktop applications, browsers, etc.). The category filter engine (144) may use information about the proposed user website (i.e., in cases when the user website (130) is not yet created) or the user website (130) (i.e., in cases the user website (130) has already been created), obtained from the user (e.g., by using a questionnaire, by parsing website content from the user, by parsing the user website (130), by parsing financial records of the business of a user, and other methods), and first categorize user website (130) into one or more categories as discussed above. In one or more embodiments of the invention, the information about the user website (130) may include business information about the business of the user (e.g., the industry of the business, the products or services provided by the business, the size of the business, and other relevant information). In one or more embodiments of the invention, the category of the user website (130) is manually inputted into the category filter engine (144). The category filter engine (144) may then filter web analytics data based on the category of the user website (130). For example, if the user website (130) is owned or operated by a business of the user, the category filter engine may only retain website elements (172) and website metrics (176) from websites in the same industry as the business of the user.

In one or more embodiments of the invention, the web analytics data extraction engine (146) includes any combination of software and software components (e.g., data structures, algorithms, procedures, libraries, modules, interfaces, frameworks, applets, web applications, desktop applications, browsers, etc.). The web analytics data extraction engine (146) may first aggregate web analytics data, removing unnecessary data to facilitate further processing and analysis. For example, the web analytics data extraction engine may remove spam on a message board of one of the websites (e.g. website A (132), website N (134) in FIG. 1). Subsequently, the web analytics data extraction engine may calculate various website metrics (176) from the web analytics data. For example, the conversion rate (180) and the number of visits (178) may be extracted from the web analytics data for websites (e.g. website A (132), website N (134) in FIG. 1) and the user website (130).

Continuing with FIG. 2, the conversion improvement engine (148) includes any combination of software and software components (e.g., data structures, algorithms, procedures, libraries, modules, interfaces, frameworks, applets, web applications, desktop applications, browsers, etc.) in accordance with one or more embodiments of the invention. The conversion improvement engine (148) may analyze web analytics data by finding correlations between website elements (172) and website metrics (176) for each website (e.g. website A (132), website N (134) in FIG. 1), as well as changes in website elements (172) and changes in website metrics (176) for each website (e.g. website A (132), website N (134) in FIG. 1). As a result, the conversion improvement engine (148) may find what changes to a user website (130) may improve performance (182) (e.g., conversion rate (180)). For example, the conversion improvement engine (148) may obtain updated website elements from website A (132 in FIG. 1) and an updated conversion rate that is higher than previously calculated. Based on this, the conversion improvement engine (148) may deduce what changes to website A (e.g., website color) resulted in an increased conversion rate and store this information in the data repository (170) as one of the rules (184).

In one or more embodiments of the invention, the traffic improvement engine (150) includes any combination of software and software components (e.g., data structures, algorithms, procedures, libraries, modules, interfaces, frameworks, applets, web applications, desktop applications, browsers, etc.). The traffic improvement engine (150) may analyze web analytics data by finding correlations between website elements (172) and website metrics (176) for each website (e.g. website A (132), website N (134) in FIG. 1), as well as changes in website elements (172) and changes in website metrics (176) for each website (e.g. website A (132), website N (134) in FIG. 1). As a result, the traffic improvement (150) engine may find what changes to a website (e.g. website A (132), website N (134) in FIG. 1) increase the number of visits (178). For example, the traffic improvement engine (150) may obtain updated website elements from website A (132 in FIG. 1) and an updated number of visits that is higher than previously calculated. Based on this, the traffic improvement engine (150) may deduce what changes to website A (e.g., website text) resulted in increased visits and store this information in the data repository (170) as one of the rules (184). In one or more embodiments of the invention, the traffic generation engine (150) may analyze web analytics data before, after, or at the same time (i.e., in parallel) as the conversion improvement engine (148).

In one or more embodiments of the invention, the website template generation engine (152) includes any combination of software and software components (e.g., data structures, algorithms, procedures, libraries, modules, interfaces, frameworks, applets, web applications, desktop applications, browsers, etc.). The website generation template may use website elements (172) and the results of the analysis performed by the conversion improvement engine (148) and traffic improvement engine (150) and generate website templates (174) for the user. The website templates (174) may be generated specifically to maximize performance (182) of the website (e.g., achieve a high conversion rate and a large number of visits), as discussed above. For example, the website template (174) may be generated based on website design best practices such as proper browser compatibility, organized page layout, clearly labeled navigation links, proper color contrast, working hyperlinks, and other website design best practices that the user may not be aware of when creating the user website (130). Further, the website templates generation engine (152) may incorporate features into the website templates (174) that are specific to the category of the user website (130) and achieve high performance (182). For example, website templates for a small business selling shoes may incorporate layouts for large images of on-sale products, whereas website templates for a medical professional may include space for an extended text section and contact information.

In one or more embodiments of the invention, the recommendation generation engine (154) includes any combination of software and software components (e.g., data structures, algorithms, procedures, libraries, modules, interfaces, frameworks, applets, web applications, desktop applications, browsers, etc.). The recommendation generation engine (154) may use website elements (172) and the results of the analysis performed by the conversion improvement engine (148) and traffic improvement engine (150) and generate recommendations (186) for the user. As in the case for website templates (174), the recommendations (186) may be generated specifically to optimize website metrics for the user website (130) (e.g., achieve a high conversion rate and a large number of visits), as discussed above. Recommendations (186) may also follow website design best practices and incorporate features specific to the category of the user website (130), as described above for the website templates generation engine (152). Further, updated recommendations may be generated based on updated web analytics data collected after the user website (130) has been created.

Continuing with FIG. 2, the website design user interface (156) includes any combination of software and software components (e.g., data structures, algorithms, procedures, libraries, modules, interfaces, frameworks, applets, web applications, desktop applications, browsers, etc.) in accordance with one or more embodiments of the invention. The website user interface may provide a design environment for the user to facilitate the creation of the user website (130). The website design user interface (156) may display the website templates (174) generated by website template generation engine (152) and allow the user to select which website template to use. Further, the website design user interface (156) may display the recommendations (186) generated by the recommendation generation engine (154) and allow the user to choose which recommendations (186) to follow. In one or more embodiments of the invention, the website design user interface (156) may be used to update the user website (130), after the user website (130) has been created, based on updated recommendations received from the recommendation generation engine (154).

In one or more embodiments of the invention, the website modification engine (158) includes any combination of software and software components (e.g., data structures, algorithms, procedures, libraries, modules, interfaces, frameworks, applets, web applications, desktop applications, browsers, etc.). The website modification engine (158) may modify the user website (130) based on recommendations (186) from the recommendation generation engine (154) and website elements of the user website (130). In one or more embodiments of the invention, the website modification engine (158) makes modifications to the user website (130) directly and without user intervention. In one or more embodiments if the invention, the website modification engine (158) may require approval from the user before a modification is made. For example, the website modification engine (158) may detect that the header of a website was unintentionally deleted and fix the error automatically, informing the user afterwards of the correction.

In one or more embodiments of the invention, the performance analysis engine (160) includes any combination of software and software components (e.g., data structures, algorithms, procedures, libraries, modules, interfaces, frameworks, applets, web applications, desktop applications, browsers, etc.). The performance analysis engine (160) may compare the performance of the user website (130) with a performance of other websites (e.g. website A (132), website N (134) in FIG. 1) in the same category as the user website (130) and based on the website metrics (176) calculated by the web analytics extraction engine (146). For example, the performance analysis engine (160) may provide a ranking of the user website (130), relative to websites (e.g. website A (132), website N (134) in FIG. 1), based on conversion rate (180), number of visits (178), and any other relevant website metric (176). In another example, the performance analysis engine (160) may track changes in the performance of the user website (130) and other websites (e.g. website A (132), website N (134) in FIG. 1). In one or more embodiments of the invention, the performance analysis engine (160) may calculate an estimated performance of the user website (130) based on whether the user follows or refuses to follow one or more recommendations (186) provided by the recommendation generation engine (154).

In one or more embodiments of the invention, the reporting user interface (162) includes any combination of software and software components (e.g., data structures, algorithms, procedures, libraries, modules, interfaces, frameworks, applets, web applications, desktop applications, browsers, etc.). The reporting user interface (162) may obtain analysis results of performance (182) from the performance analysis engine (160) and report the analysis results to the user. For example, the reporting user interface (162) may display the ranking of the user website (130) with respect to the other website (e.g. website A (132), website N (134) in FIG. 1) with respect to each website metric (176). In another example, the estimated performance may be displayed on the user reporting interface (160) depending on which recommendations (186) were followed.

Continuing with FIG. 2, the administrator interface (164) includes any combination of software and software components (e.g., data structures, algorithms, procedures, libraries, modules, interfaces, frameworks, applets, web applications, desktop applications, browsers, etc.) in accordance with one or more embodiments of the invention. The administrator interface (164) may directly access website analytics data in the data repository (170) and present the web analytics data to an administrator. Generally speaking, an administrator may be a person who maintains the web analytics application (140) and who provides the web analytics application (140) to the user as a service or product. The administrator may use the web analytics data, as well as calculated website metrics (176), and modify any portions of the web analytics application (140) to provide better results (e.g., better website templates, better recommendations, more insight into the website category of the user website) for the user. For example, the administrator may change what is filtered by the category filter engine (144) or modify the recommendation generation engine (154) based on insights gained from the calculated website metrics (176).

In one or more embodiments of the invention, the A/B testing module (166) includes any combination of software and software components (e.g., data structures, algorithms, procedures, libraries, modules, interfaces, frameworks, applets, web applications, desktop applications, browsers, etc.). The A/B testing module (166) may modify a portion of the user website (130) to obtain a modified user website (131). Subsequently, the A/B testing module may perform A/B testing on the two versions of the user website (i.e., user website (130) and modified user website (131)). The process of A/B testing includes directing a portion of visitors to the modified user website (131) and comparing website metrics from the modified user website (131) to the website metrics of the original user website (130) to deduce whether the modifications improve the performance (182) of the user website (130). In one or more embodiments of the invention, instead of modifying the user website (130), two versions of a test website are created to test a modification of a certain website element. The test website may be created specifically for A/B testing or may be any other website (e.g. website A (132), website N (134) in FIG. 1).

Continuing with FIG. 2, the user device (110) may store and execute a portion of the web analytics application (140). In one of more embodiments of the invention, the website design user interface (156) and the reporting user interface (162) are displayed on the user device (110). For example, the website design user interface (156) and the reporting user interface (162) are stored on server A (118) but displayed to the user on the user device (110) via a web browser (e.g., software as a service). The user may then use the website design interface to send website content (112), template selections (114), and recommendation approvals (116) to the web analytics application (140). Each of these terms is described below.

In one or more embodiments of the invention, website content (112) may include website elements (e.g., text, images, content, links, or other elements) required to fill sections of a website template (e.g., header, footer, navigation bar, introduction, body, front page image space, etc.) with information relevant to the user website (130). In one or more embodiments of the invention, a website template selection (114) is a selection, made by the user, of one of the website templates (174) shown to the user on the user website design user interface (156). In one or more embodiments of the invention, the user selects portions of several website templates (174) to form the user website (130). In one or more embodiments of the invention, the user modifies the website template after making the selection (114). In one or more embodiments of the invention, a recommendation approval (116) is an approval of a recommendation that was generated by the recommendation generation engine (154). In one of more embodiments of the invention, when a user sends a recommendation approval (116) to the website analytics application (140), website elements associated with the corresponding recommendation (186) may be automatically changed. Conversely, a user may also send recommendation refusals (not shown) in case the user does not agree with the corresponding recommendations (186).

Figure 3:
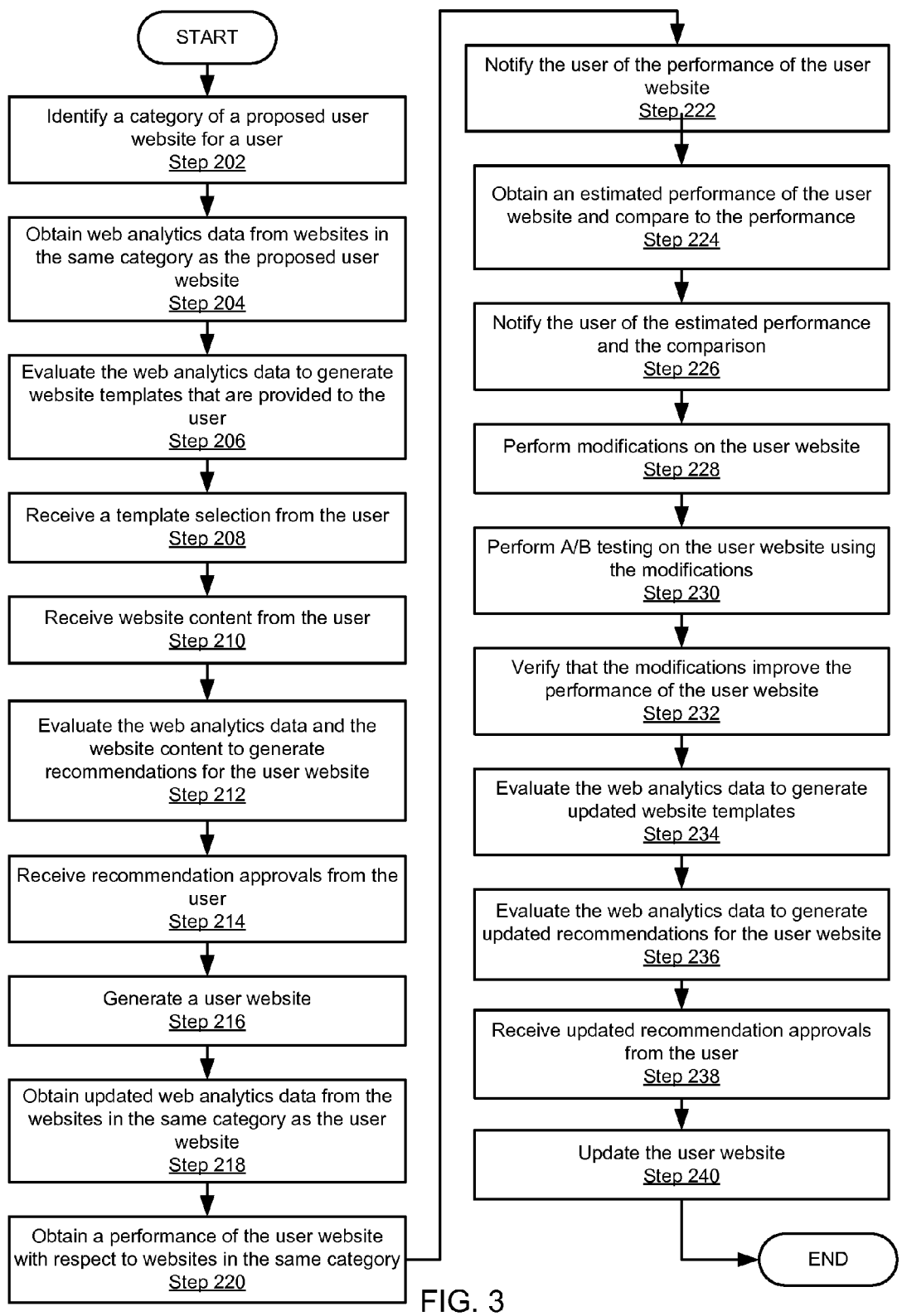
FIG. 3 shows flowcharts in accordance with one or more embodiments of the invention.

FIG. 3 shows a flowchart in accordance with one or more embodiments of the invention. The process shown in FIG. 3 may be used, for example, by a system (100) to help a user create and maintain a website (e.g. user website (130)). Further, the process shown in FIG. 3 may be implemented using one or more components of the system (100). Those skilled in the art, having the benefit of this detailed description, will appreciate that the sequence of steps shown in FIG. 3 may differ among embodiments of the invention, and that one or more of the steps shown in FIG. 3 may be repeated or omitted. Further, those skilled in the art, having the benefit of this detailed description, will appreciate that although the steps in FIG. 3 are shown occurring sequentially, some of the steps shown in FIG. 3 may occur in parallel with other steps in FIG. 3.

Initially, before a user creates a user website, the category of the user's proposed website (i.e., proposed user website) is identified (STEP 202). As discussed above, one example of a category may be an industry of the user's business. In one or more embodiments of the invention, the category of the user website may be further divided into subcategories. For example, a website may be categorized as an online apparel store and further categorized into a subcategory including small businesses or a subcategory including sales of high-end brands.

In STEP 204, web analytics data is obtained from websites that are of the same category as the proposed user website. In one or more embodiments of the invention, web analytics data is first collected from websites of various categories and stored in a data repository (e.g., a data repository). Subsequently, the web analytics data in the category of the proposed user website may be accessed from the data repository and used for further processing.

In STEP 206, the web analytics data is evaluated and website templates are generated for the proposed user website. As discussed above, web analytics data may be used to derive website metrics for websites in the same category as the proposed user website. Further, as discussed above, the website templates may be generated based on website design best practices. Further, as discussed above, the website templates may be based, at least in part, on high performing websites (e.g., websites with high conversion rate). In one or more embodiments of the invention, a high performance is a performance exceeding a performance threshold (e.g., a conversion rate threshold).

The performance threshold may be set in several ways. In one example, the performance threshold may be manually set by the user or an administrator. In another example, the performance threshold may be based on the performance of websites in the same category as the user website (e.g., based on top ranking websites in the same category). In one or more embodiments of the invention, the generated website templates are based, at least in part, on websites with a high increase in performance (e.g., websites with a high conversion rate increase). In one or more embodiments of the invention, a high performance increase is a performance increase exceeding a performance increase threshold (e.g., a conversion rate increase threshold) in a certain time interval. The time interval may be any reasonable amount of time to evaluate changes in performance (e.g., one week, one month, one year, etc.). In one or more embodiments of the invention, multiple time intervals and thus multiple performance increases and performance increase thresholds may be used. The performance increase threshold may be set in several ways. In one example, the performance increase threshold may be manually set by the user or an administrator. In another example, the performance increase threshold may be based on the performance increase of website in the same category as the user website (e.g., most improved websites in the same category).

In one or more embodiments of the invention, the website templates generated for the user website are based on results of A/B testing, which is further described below. In one or more embodiments of the invention, the website templates are generated based on historical patterns in the web analytics data for other websites (e.g., have the website templates consistently led to high performance websites, have the website templates improved conversion rates of other websites, have there been any drawbacks associated with the website templates to other websites, etc.) The final decision on how the website templates are to be generated or which website templates are to be provided to the user may be based on a weighted average of website templates of high performing websites, website templates of websites with high recent increases in performance, A/B testing, and historical patterns. After the website templates are generated, the website templates may be provided to the user via a user interface.

Those skilled in the art, having the benefit of this detailed description, will appreciate that providing the user with a template that is optimized for performance may increase the number of goal achievements (e.g., business sales, advertising revenue, etc.) for the user. Although a poorly performing website may be corrected after the website has been created (e.g., by making significant changes to some or all of the website elements of the poorly performing website), the process of doing so may be difficult and expensive. As a result, presenting the user with a high performance website template during the website creation process may save the user considerable resources in the future.

In STEP 208, a user selects a website template from the provided website templates. After the selection is made, the user populates the website template with website content (STEP 210). For example, the user provides the necessary website elements (e.g., website content, layout, organization, pages, links, text, templates, add-ons, color, and other website elements) to effectively change the selected website template into a user website.

In STEP 212, the web analytics data and the website content added by the user are evaluated and recommendations are generated for the proposed user website. In one or more embodiments of the invention, the recommendations are generated and provided to the user while the user is adding the website content to the website template. In one or more embodiments of the invention, the recommendations are provided once the user website is complete. As in the case for website templates, the recommendations may be based on high performing websites and on websites with a high performance increase. Further, as in the case for website templates, recommendations may be based on the results of A/B testing and based on historical patterns in the web analytics data for other websites (e.g., whether the recommendations consistently led to higher performance of other websites, whether the recommendations improved conversion rates of other websites or increased the number of visitors to other websites, whether the recommendations led to any drawbacks to other websites, etc.). The final decision on which recommendations are generated may be based on a weighted average of the website elements and performance of high performing websites, changes in the website elements and changes in performance of websites with high recent increases in performance, A/B testing, and historical patterns. After the recommendations are generated, the recommendations may be provided to the user via a user interface (e.g., a website design user interface).

Those skilled in the art, having the benefit of this detailed description, will appreciate that providing recommendations to the user during the website creation process may improve the resulting user website and thus increase the number of goal achievements (e.g., business sales, advertising revenue, etc.) for the user. In addition, the user may gain insight into the website category of the user website before actually launching the user website, allowing the user to better plan a strategy or course of action (e.g., business strategy, advertising partners, website content) for the user website.

In STEP 214, recommendation approvals corresponding to the recommendations given are received from the user. The user may choose to approve all, some, or none of the recommendation generated. As discussed above, when recommendation approvals are received, website content associated with the recommendation approvals may be changed automatically. After the website template is chosen, all of the website content is added, and all of the recommendations are considered (e.g., with either recommendation approvals or recommendation refusals), the user website is generated (STEP 216).

After the user website has been generated, updated web analytics data may be obtained from websites in the same category as the user website (STEP 218). In addition, now that the user website is created, updated web analytics data may include web analytics data from the user website. In one or more embodiments of the invention, web analytics data is collected continuously and thus the updated web analytics data may be immediately available after the user website has been created. In one or more embodiments of the invention, web analytics data is collected periodically and may be available at a point of time after the user website has been created.

In STEP 220, the performance of the user website, relative to other websites in the same category as the user website, may be extracted from the updated web analytics data. As discussed above, the performance may include a ranking of the user website by various website metrics (e.g., number of visits, conversion rate, etc.). In STEP 222, the user is notified of the performance of the user website. The notification may be done by various means (e.g., mail, email, telephone, webpage, and other methods of communication).

In STEP 224, the estimated performance of the user website may be extracted from the updated web analytics data. In one or more embodiments of the invention, the estimated performance is an extrapolation of the performance of the user website based on which recommendations are approved or refused. For example, if a user refuses a recommendation to change the color of a website, the estimated performance may be lowered because the current website color is not ideal for the category of the user website. The magnitude of how much the estimated performance is raised or lowered may be based on the importance of a particular recommendation. In one or more embodiments of the invention, estimated performance is calculated based on actual performance changes of websites in the same category as the user website that received similar recommendations in the past. By looking into this historical data, one can evaluate the importance of each recommendation and thus deduce an estimated performance. In STEP 226, the estimated performance and the performance of STEP 220 may be shown to the user at the same time, thus providing a user with a comparison between current performance and the estimated performance that can be obtained based on the recommendations.

Those skilled in the art, having the benefit of this detailed description, will appreciate that sending the user an analysis of the performance of the user website, as well as a detailed outline of which recommendations may change the performance most significantly, provides many benefits for the user. For example, the user may gain more insight into the website category of the user website by understanding where the recommendations come from and what the actual impact of each recommendation is. In another example, analyzing the impact of each recommendation helps the user decide which recommendations to approve and which recommendations the user can afford to refuse.

In STEP 228, one or more modifications may be performed to the website to obtain a modified user website (e.g., a modified user website). Following the modification, A/B testing may be performed on the user website and the modified user website (STEP 228), as described above. The results of the testing may be viewed by the user and by an administrator. In STEP 232, verification of the modification is performed. In the case that the modification improves the performance of the website (e.g., yields a higher conversion rate), the steps for evaluating web analytics data (i.e., STEP 206, STEP 212) may take into account the improvement of the modification. Similarly, if the modification reduces the performance (e.g., yields a lower conversion rate), the steps for evaluating web analytics data (i.e., STEP 206, STEP 212) may take into account the drawback of the modification. As discussed above, instead of using the user website for A/B testing, a test website may be used instead.

In STEP 234, updated website templates may be generated based on the updated web analytics data. Since the user website has already been created, the updated web templates may be used by other users who will use this process for creating websites.

In STEP 236, the updated web analytics data is evaluated and updated recommendations are generated for the user website. As in the case for the original recommendations, the updated recommendations may be based on high performing websites and on websites with a high increase in performance. However, as updated recommendations are generated at a later point in time, high performing websites at this point of time may be different than the high performing websites from the point of time when the original recommendations were generated.

Those skilled in the art, having the benefit of this detailed description, will appreciate that providing the user with updated recommendations after the website is created allows the user further improve the performance of the user website. Further, updated recommendations allow the user to keep track of recent trends, innovations, changes in visitor behavior, new competitors, and other important events that may require a response from the user (e.g., by making changes to the user website to maintain the performance of the user website). Updated recommendations may also allow the user to see what the user's competitors are doing and how the actions of the competitors affect the performance of competitors' websites.

In STEP 238, the updated recommendation approvals corresponding to the updated recommendations given in STEP 236 are received from the user. As discussed above, the user may choose to approve all, some, or none of the updated recommendations. Further, when the updated recommendation approvals are received, the website content associated with the updated recommendation approvals may be changed automatically. After the user responds to all updated recommendations (e.g., with either updated recommendation approvals or updated recommendation refusals), the user website is updated (STEP 240).

After STEP 240, the process ends. Alternatively, execution of the process may be continue by returning to STEP 202 (e.g., for another user or for creating another website) or STEP 228 (e.g., for the current user updating the website).

In one or more embodiments of the invention, before creating the website, the user may obtain access to a portion of the web analytics data and a portion of the calculated website metrics. The user may then use this information to determine the expected number of goal achievements (e.g., revenue, profit, subscriptions, etc.) of websites in the same category as the proposed user website to determine whether creating the user website is a right decision (e.g., whether the website would be financially profitable).

In one or more embodiments of the invention, the category of the user website or the subcategory of the user website may be added or modified after the user website is created or during the creation of the user website. The category may be modified by parsing the website content of the user website as it is being added or modified and determining a category or subcategory based on the website content. For example, a user may begin selling shoes for the first time on the user website, and as a result a category or subcategory may be modified appropriately (e.g., subcategory may become "shoe store"). As a result, website metrics, website elements, and comparisons of performance to other websites may be modified as other websites may be added to the analysis because they are now in the same category or subcategory as the user website. Accordingly, the websites that are compared to the user website with respect to performance and generating website templates and recommendations may remain relevant to the user website despite changes in the website content of the user website.

In one or more embodiments of the invention, several other website metrics, including a click path, an engagement time, a bounce rate, and a frequency, may be used by the system in FIG. 1 and FIG. 2 and the process in FIG. 3 to generate website templates and recommendation for a user. Generally speaking, a click path may be a sequence of hyperlinks that visitors follow on a website. Knowing the click path of visitors may help users better organize the website content and layout to obtain higher performance. Generally speaking, engagement time may be the time a visitor interacts with content on a website via mouse clicks, scrolls, and hovers. These mouse movements may be used to monitor visitor behavior on the website. Generally speaking, a bounce rate may be the percentage of visitors who enter and exit a website without viewing any other pages of the website. This is an important measure of the effectiveness of the front page of the website. Generally speaking, the frequency may be a ratio of visits per visitor, and is generally used to measure the loyalty of the audience of the website, which may provide further insight into how a website should be modified. Those skilled in the art, having the benefit of this detailed description, will appreciate that the specific website metrics disclosed above are just examples and many other website metrics exist and can be used to generate website templates and recommendations for the user.

Figure 4:
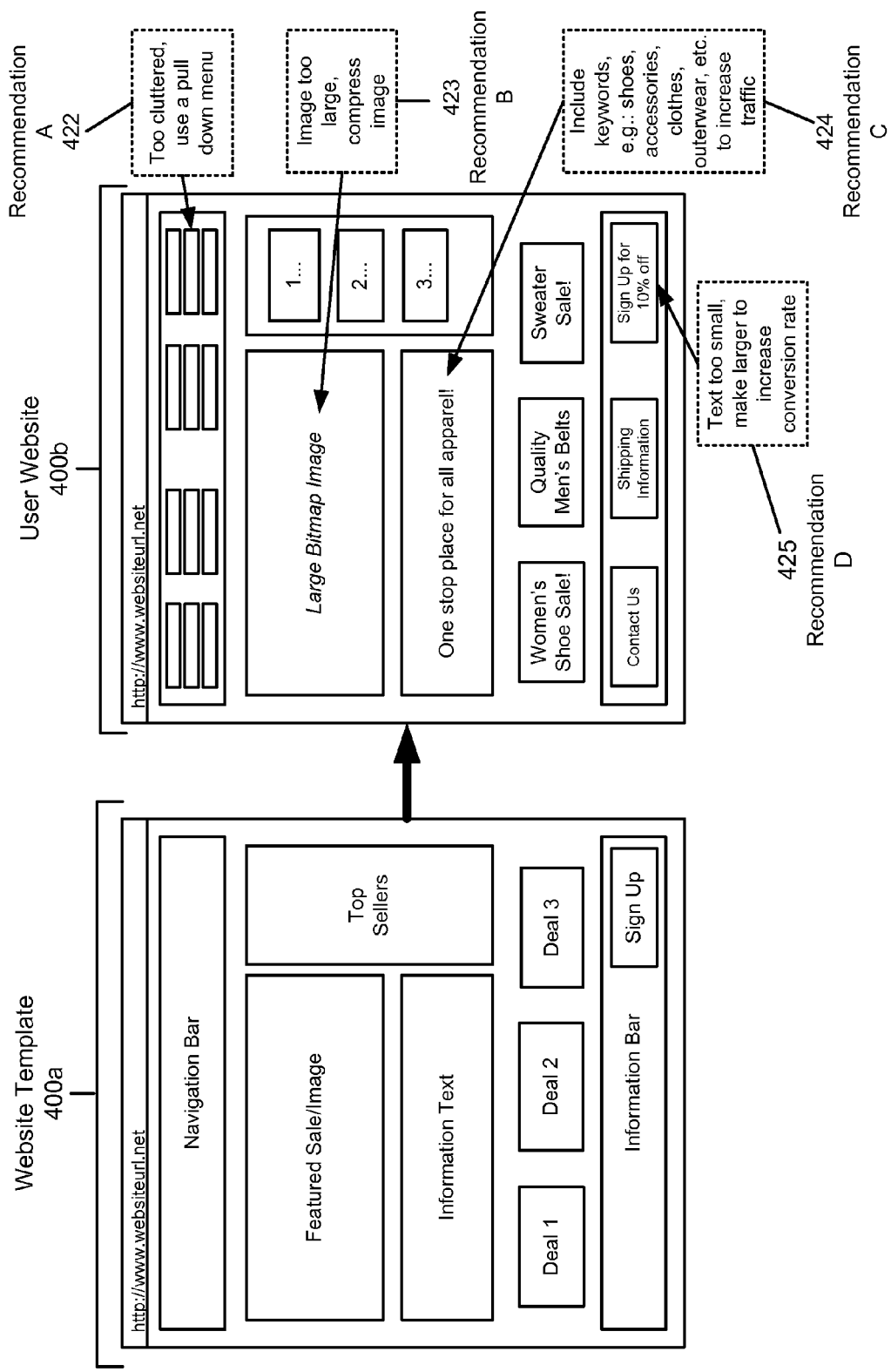

FIG. 4 shows an example in accordance with one or more embodiments of the invention. As shown in FIG. 4, the example includes a website template (400a), a user website (i.e., a website template with website content added) (400b), and recommendations (e.g., recommendation A (422), recommendation B (423), recommendation C (424), and recommendation D (425)) next to the user website (400b). The website template, the user website, and the recommendations may be generated by the process in FIG. 3. The user website (400b) and the recommendations (e.g., recommendation A (422), recommendation B (423), recommendation C (424), and recommendation D (425)), as shown in FIG. 4, may be displayed on a computer display.

As shown in FIG. 4, after the user populates the website template (400a) with website content to obtain the user website (400b), recommendations (e.g., recommendation A (422), recommendation B (423), recommendation C (424), and recommendation D (425)) appear on a user interface used to modify the website (e.g., in a panel external to the website view of a web design user interface). The recommendations may provide suggestions to the user on how to populate the website template. In addition, the recommendations may alert the user in case certain modifications may negatively impact the performance of the user website (400b). Several examples of recommendations are described below.

In the example, a recommendation A (422) alerts the user that a navigation bar is too cluttered and suggests implementing a pull-down menu instead. Those skilled in the art, having the benefit of this detailed description, will appreciate that a cluttered navigation bar may frustrate some visitors and thus negatively impact the conversion rate and increase the bounce rate. In the example, a recommendation B (423) alerts the user that images used on the user website (400b) are too large and suggests compressing these images. Those skilled in the art, having the benefit of this detailed description, will appreciate that large images may cause visitors to leave a website because the website takes too long to load. In the example, a recommendation C (424) may suggest to use keywords relevant to the business of the user and the content of the user website (400b) on the front page. In addition, the recommendation C (424) informs the user that a proper fix may increase website traffic. Those skilled in the art, having the benefit of this detailed description, will appreciate that having proper text on a website may improve search engine ranking when potential visitors search for keywords relevant to the website. In the example, a recommendation D (425) may alert the user that a subscription sign up button, likely one of the goal achievements of this user website (400b), is too small and suggests making the button and the associated text larger. In addition, the recommendation D (425) informs the user that a proper fix may increase the conversion rate of the user website (400b). Those skilled in the art, having the benefit of this detailed description, will appreciate that having proper visibility of critical links on a website (e.g., links taking a visitor closer to a sale) may increase conversion rates.

FIG. 5 shows an example in accordance with one or more embodiments of the invention. As shown in FIG. 5, the example includes a user reporting interface (500) (e.g., user reporting interface (160)) that may display information about a user website as well as the performance and estimated performance of the user website, as obtained by the process in FIG. 3.

As shown in FIG. 5, the user reporting interface (500) provides website metrics for the user website such as a conversion rate and a number of visits in one month. These website metrics may be updated continuously or with some time interval (e.g., weekly). The user reporting interface (500) also provides the current ranking of the website among websites in the category of the user website based on one or more website metrics. Further, the change in ranking (e.g., a measure of how much the user website has improved relative to other websites) is also provided. In the example, the average conversion rate and average number of visits of websites in the same category as the user website are also provided. In the example, the user reporting interface (500) reveals which websites are the top rankers to allow the user to visit these websites and visually compare them against the user website. Further, the websites that have most improved in ranking are also provided for the user.

As shown in FIG. 5, the user reporting interface (500) also provides a summary of what other websites (e.g., most improved websites) have done to improve their ranking. For example, the user reporting interface (500) may alert the user that recent changes to website layout have yielded most improvements in the websites in the same category as the user's website. In the example, the user reporting interface (500) also shows a table with estimated changes in certain website metrics (e.g., conversion rate and number of visits) based on recommendations that were given to the user (e.g., by the process in FIG. 3). Thus the user is able to see what impact on performance approving or refusing each recommendation may have.

Figure 6:
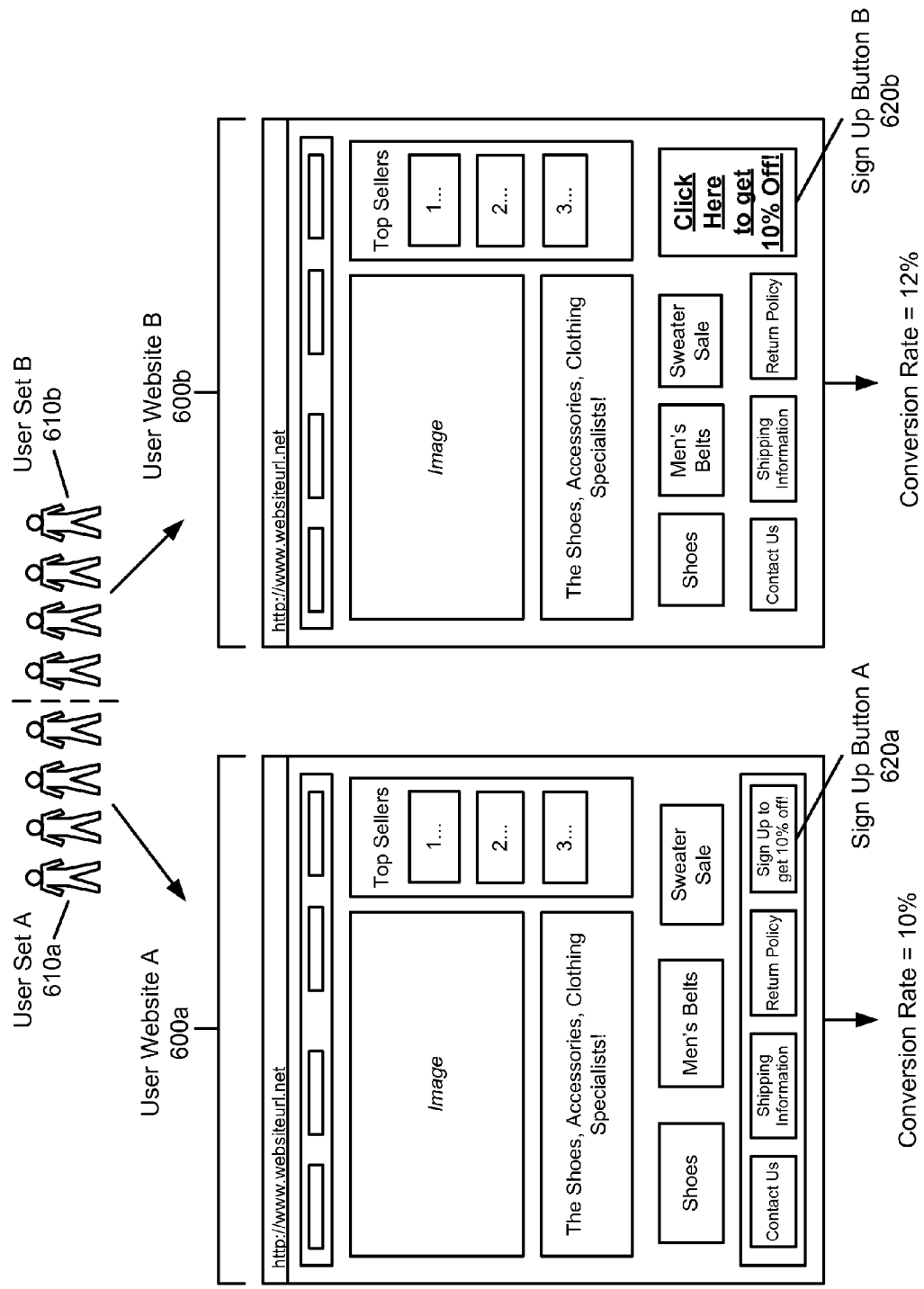

FIG. 6 shows an example in accordance with one or more embodiments of the invention. As shown in FIG. 6, the example includes two versions of a front page of a user website (i.e., user website A (600a) and user website B (600b)) that have two different versions of a sign up button (i.e., sign up button A (620a) and sign up button B (620b)). Visitors to the user website are divided into two sets (i.e., user set A (610a) and user set B (610b)) and each set of visitors is directed to a different version of the user website (i.e., user set A (610a) is directed to user website A (600a) and user set B (610b) is directed to user website B (600b)). User website B (600b) may be derived from user website A (600a) by making a modification during A/B testing as described in the process in FIG. 3.

As shown in FIG. 6, user website B (600b) achieves a higher conversion rate (i.e., 2% higher) than user website A (600a) while the only difference between the two versions is a different sign up button. Sign up button B (620b) has different text than sign up button A (620a) (i.e., "click here" instead of "sign up") and the text in sign up button B (620b) is significantly larger than the text in sign up button A (620a). Those skilled in the art, having the benefit of this detailed description, will appreciate that because conversion rate increased when the sign up button was changed, sign up button B (620b) may be the cause of this conversion rate increase and thus may be preferable. A visitor may be more likely to see sign up button B (620b) and less likely to be dissuaded from clicking by the "sign up" text in sign up button A (620a) (e.g., visitors may not want to sign up immediately but may do so anyway after clicking on the link of sign up button B (620b)). Thus, user website B (600b) achieves more goal achievements (e.g., subscriptions, sales) and thus a higher conversion rate than user website A (600a).

Figure 7:
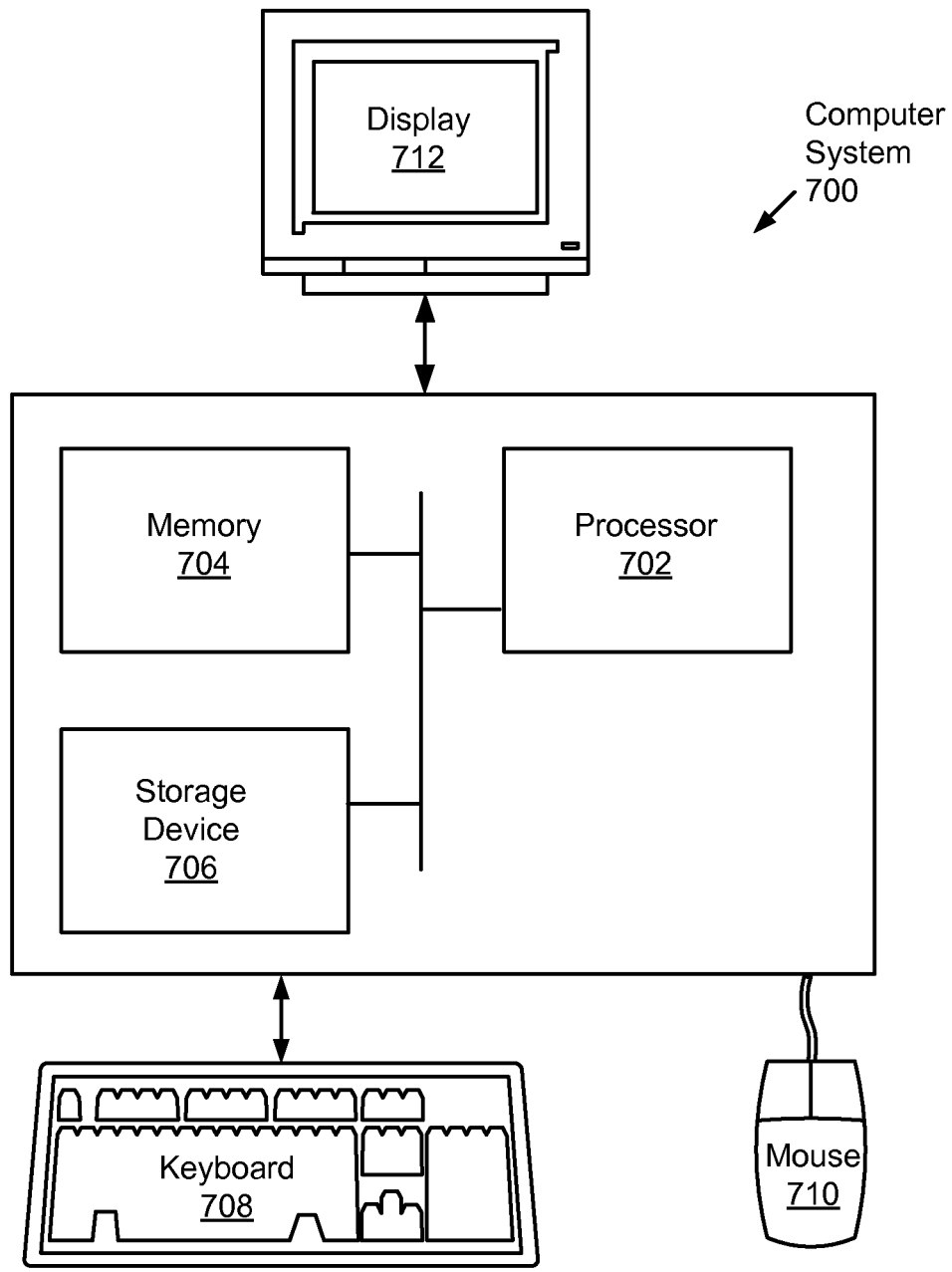
FIG. 7 shows a computer system in accordance with one or more embodiments of the invention.

FIG. 7 shows a computer system (700) in accordance with one or more embodiments of the invention. As shown in FIG. 7, the computer system (700) includes a processor (702) such as an integrated circuit, central processing unit, or other hardware processor, associated memory (704), a storage device (706), and numerous other elements and functionalities typical of today's computers (not shown). The computer system (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (700) may be located at a remote location and connected to the other elements over a network. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing websites, comprising:
identifying an industry of a business related to a user;
obtaining a plurality of website analytics data items from a plurality of websites related to a plurality of businesses, wherein each of the plurality of businesses are in the industry, and
wherein the plurality of website analytics data items comprise a conversion rate;
evaluating the plurality of website analytics data items to generate a plurality of website templates for the user based on historical patterns in the web analytics data;
providing the plurality of website templates to the user;
receiving a selection from the user of a website template from the plurality of website templates;
receiving website content for a user website from the user;
evaluating the plurality of website analytics data items and the website content to generate a plurality of recommendations for the user website, wherein the plurality of recommendations are based on a plurality of modifications to a subset of the plurality of websites that resulted in an increase of the conversion rate;
determining, for each of the plurality of recommendations, an estimated performance impact of the recommendation;
providing the plurality of recommendations and the estimated performance impact for the user website to the user;
receiving a plurality of recommendation approvals of the plurality of recommendations for the user website from the user; and
generating the user website based on the website content, the website template, and the plurality of recommendation approvals, wherein the user website is separate from the plurality of websites.

2. The method of claim 1, further comprising:
obtaining, after generating the user website, a plurality of updated web analytics data items from the plurality of websites; and
updating the user website based on the plurality of updated web analytics data items.

3. The method of claim 2, further comprising:
generating a plurality of updated recommendations for the user website based on the plurality of updated web analytics data items;
providing the plurality of updated recommendations to the user; and
receiving a plurality of updated recommendation approvals of the plurality of updated recommendations for the user website from the user.

4. The method of claim 2, further comprising:
generating a plurality of updated website templates based on the plurality of updated web analytics data items.

5. The method of claim 1, further comprising:
obtaining a performance of the user website in comparison to the plurality of websites; and
notifying the user of the performance of the user website.

6. The method of claim 1, further comprising:
selecting a plurality of website modifications for the user website;
performing A/B testing on the user website using the plurality of website modifications; and generating a plurality of updated recommendations based on a result of the A/B testing.

7. The method of claim 1, wherein the plurality of website templates are generated using a plurality of website elements of the plurality of websites.

8. The method of claim 1, wherein generating the plurality of website templates and generating the plurality of recommendations are based on a set of websites of the plurality of websites having a conversion rate above a conversion rate threshold.

9. The method of claim 1, wherein identifying the business category of the business related to the user comprises:
   receiving, from the user, business information about the business,
   parsing the website content for the user website, and
   determining the business category of the business based on the business information and the website content.

10. A non-transitory computer readable storage medium comprising instructions for managing websites, the instructions comprising functionality to:
   identify an industry of a business related to a user;
   obtain a plurality of website analytics data items from a plurality of websites related to a plurality of businesses, wherein each of the plurality of businesses are in the industry, and wherein the plurality of website analytics data items comprise a conversion rate;
   evaluate the plurality of website analytics data items to generate a plurality of website templates for the user based on historical patterns in the web analytics data;
   provide the plurality of website templates to the user;
   receive a selection from the user of a website template from the plurality of website templates;
   receive website content for a user website from the user;
   evaluate the plurality of website analytics data items and the website content to generate a plurality of recommendations for the user website, wherein the plurality of recommendations are based on a plurality of modifications to a subset of the plurality of websites that resulted in an increase of the conversion rate;
   determine, for each of the plurality of recommendations, an estimated performance impact of the recommendation;
   provide the plurality of recommendations and the estimated performance impact for the user website to the user;
   receive a plurality of recommendation approvals of the plurality of recommendations for the user website from the user; and
   generate the user website based on the website content, the website template, and the plurality of recommendation approvals, wherein the user website is separate from the plurality of websites.

11. The non-transitory computer readable storage medium of claim 10, the instructions further comprising functionality to:
   obtain, after generating the user website, a plurality of updated web analytics data items from the plurality of websites; and
   update the user website based on the plurality of updated web analytics data items.

12. The non-transitory computer readable storage medium of claim 11, the instructions further comprising functionality to:
   generate a plurality of updated recommendations for the user website based on the plurality of updated web analytics data items;
   provide the plurality of updated recommendations to the user; and
   receive a plurality of updated recommendation approvals of the plurality of updated recommendations for the user website from the user.

13. The non-transitory computer readable storage medium of claim 10, the instructions further comprising functionality to:
   obtain a performance of the user website in comparison to the plurality of websites; and
   notify the user of the performance of the user website.

14. The non-transitory computer readable storage medium of claim 10, the instructions further comprising functionality to:
   select a plurality of website modifications for the user website;
   perform A/B testing on the user website using the plurality of website modifications; and
   generate a plurality of updated recommendations based on a result of the A/B testing.

15. A system for managing websites, comprising:
   a processor;
   a memory associated with the processor;
   a web analytics application resident in the memory and executing under control of the hardware processor, the web analytics application configured to:
      identify an industry of a business related to a user;
      obtain a plurality of website analytics data items from a plurality of websites related to a plurality of businesses, wherein each of the plurality of businesses are in the industry, and wherein the plurality of website analytics data items comprise a conversion rate;
      evaluate the plurality of website analytics data items to generate a plurality of website templates for the user based on historical patterns in the web analytics data;
      provide the plurality of website templates to the user;
      receive a selection from the user of a website template from the plurality of website templates;
      receive website content for a user website from the user;
      evaluate the plurality of website analytics data items and the website content to generate a plurality of recommendations for the user website, wherein the plurality of recommendations are based on a plurality of modifications to a subset of the plurality of websites that resulted in an increase of the conversion rate;
      determine, for each of the plurality of recommendations, an estimated performance impact of the recommendation;
      provide the plurality of recommendations and the estimated performance impact for the user website to the user;
      receive a plurality of recommendation approvals of the plurality of recommendations for the user website from the user;
      generate the user website based on the website content, the website template, and the plurality of recommendation approvals, wherein the user website is separate from the plurality of websites; and
   a data repository configured to store the plurality of web analytics data items and the plurality of website templates.

16. The system of claim 15, wherein the web analytics application comprises:
   an aggregate data engine configured to obtain, after generating the user website, a plurality of updated web analytics data items from the plurality of websites; and a website modification engine configured to update the user website based on the plurality of updated web analytics data items.

17. The system of claim 16, wherein the web analytics application further comprises functionality to:
   generate a plurality of updated recommendations for the user website based on the plurality of updated web analytics data items;
   provide the plurality of updated recommendations to the user; and
   receive a plurality of updated recommendation approvals of the plurality of updated recommendations for the user website from the user.

18. The system of claim 15, wherein the web analytics application further comprises:
   a template generation engine configured to generate a plurality of updated website templates based on the plurality of updated web analytics data items.

19. The system of claim 15, wherein the web analytics application comprises:
   a performance analysis engine configured to obtain a performance of the user website in comparison to the plurality of websites; and
   a reporting user interface configured to notify the user of the performance of the user website.

20. The system of claim 15, wherein the web analytics application comprises:
   an analysis user interface configured to select a plurality of website modifications for the user website;
   an A/B testing engine configured to perform A/B testing on the user website using the plurality of website modifications; and
   a recommendation generation engine configured to generate a plurality of updated recommendations based on a result of the A/B testing.

* * * * *